United States Patent
Liu et al.

(10) Patent No.: US 11,301,664 B2
(45) Date of Patent: Apr. 12, 2022

(54) RECONSTRUCTION OF FINGERPRINT SUBIMAGES

(71) Applicant: Fingerprint Cards AB, Gothenburg (SE)

(72) Inventors: Jun Liu, Shanghai (CN); René Nilsson, Eslöv (SE); Hans Martinsson, Gothenburg (SE); Ehsan Hashemi, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/273,945

(22) PCT Filed: Sep. 12, 2018

(86) PCT No.: PCT/CN2018/105237
§ 371 (c)(1),
(2) Date: Mar. 5, 2021

(87) PCT Pub. No.: WO2020/051801
PCT Pub. Date: Mar. 19, 2020

(65) Prior Publication Data
US 2021/0326567 A1 Oct. 21, 2021

(51) Int. Cl.
G06K 9/36 (2006.01)
G06K 9/00 (2022.01)
G06K 9/42 (2006.01)

(52) U.S. Cl.
CPC ....... *G06K 9/00026* (2013.01); *G06K 9/0004* (2013.01); *G06K 9/42* (2013.01)

(58) Field of Classification Search
CPC ............ G02B 3/0056; H01L 27/14627; G06K 9/0004; G06K 9/00026
See application file for complete search history.

(56) References Cited

U.S. PATENT DOCUMENTS 8,629,930 B2    1/2014  Brueckner et al.
2004/0156555 A1*  8/2004  Irving ............... H04L 12/40117
                                                    382/274

(Continued)

FOREIGN PATENT DOCUMENTS

CN    102999750 B    8/2015
CN    104992158 A    10/2015

(Continued)

OTHER PUBLICATIONS

Cui et al., "Image Rendering for Microlens Array Imaging", Imaging and Applied Optics © 2015 OSA, 3 pages total. (Year: 2015).*

(Continued)

*Primary Examiner* — Brian Werner
(74) *Attorney, Agent, or Firm* — RMCK Law Group, PLC

(57) ABSTRACT

The invention relates to a method of reconstructing a fingerprint image from a plurality of fingerprint subimages captured by an optical microlens array fingerprint sensor, and a sensor system performing the method. In an aspect, a method of reconstructing a fingerprint image from a plurality of fingerprint subimages captured by an optical microlens array fingerprint sensor arranged under a touch-display of a device is provided. The method comprises capturing an image of a fingerprint with the fingerprint sensor, extracting, from the captured fingerprint image, a fingerprint subimage for each microlens in the array, normalizing the corrected fingerprint subimages with corresponding subimages of a uniformity calibration image with known uniformity properties, rotating the normalized fingerprint subimages 180 degrees while maintaining their relative position with respect to the captured fingerprint image from which the fingerprint subimages are extracted, and combining the (Continued)

rotated and normalized fingerprint subimages into a fingerprint image.

20 Claims, 8 Drawing Sheets

(56) References Cited

U.S. PATENT DOCUMENTS

| | | |
|---|---|---|
| 2010/0080544 A1 | 4/2010 | Sato |
| 2010/0142770 A1 | 6/2010 | Hayasaka et al. |
| 2013/0229532 A1* | 9/2013 | Tsutsumi .............. H04N 17/002 348/187 |
| 2015/0071502 A1 | 3/2015 | Breznicky |
| 2017/0220844 A1 | 8/2017 | Jones et al. |
| 2017/0270342 A1 | 9/2017 | He et al. |
| 2017/0323138 A1 | 11/2017 | Andersson et al. |
| 2018/0012069 A1* | 1/2018 | Chung ................. G06K 9/2036 |
| 2018/0129798 A1 | 5/2018 | He et al. |
| 2018/0137337 A1 | 5/2018 | Zeng et al. |

FOREIGN PATENT DOCUMENTS

| | | |
|---|---|---|
| EP | 3276531 A1 | 1/2018 |
| WO | 2008044781 A1 | 4/2008 |
| WO | 2017129126 A1 | 8/2017 |
| WO | 2018073335 A1 | 4/2018 |
| WO | 2018141119 A1 | 8/2018 |

OTHER PUBLICATIONS

PCT International Search Report and Written Opinion dated May 29, 2019 for International Application No. PCT/CN2018/105237, 9 pages.

* cited by examiner

RECONSTRUCTION OF FINGERPRINT SUBIMAGES

CROSS-REFERENCE TO RELATED APPLICATIONS

This application is a 371 U.S. National Stage of International Application No. PCT/CN2018/105237, filed Sep. 12, 2018. The disclosure of the above application is incorporated herein by reference in its entirety.

TECHNICAL FIELD

The invention relates to a method of reconstructing a fingerprint image from a plurality of fingerprint subimages captured by an optical microlens array fingerprint sensor, and a sensor system performing the method.

BACKGROUND

A new promising approach for optical fingerprint detection utilizes an array of microlenses implemented with the fingerprint sensor. The array of microlenses works as individual parallel mini-cameras creating an array of subimages of the object (i.e. the finger) on the underlying image sensor, which subimages can be combined into a complete fingerprint image.

As a result, the optical system can be made to have small size the z-direction with few optical elements while still being scalable in the xy-direction, thereby increasing the sensing area.

However, a problem with the use of the array of microlenses is that the resulting subimages suffer from artefacts, such as for instance non-uniform illuminance and lens distortion, which will affect the quality of the partial or complete fingerprint image created by combining the subimages.

SUMMARY

An object of the present invention is to solve, or at least mitigate, this problem and thus to provide an improved method of capturing fingerprint images with a fingerprint sensor utilizing an array of microlenses.

This object is attained in a first aspect of the invention by a method of reconstructing a fingerprint image from a plurality of fingerprint subimages captured by an optical microlens array fingerprint sensor arranged under a touch-display of a device. The method comprises capturing an image of a fingerprint with the fingerprint sensor, extracting, from the captured fingerprint image, a fingerprint subimage for each microlens in the array, normalizing the fingerprint subimages with corresponding subimages of a uniformity calibration image with known uniformity properties, rotating the normalized fingerprint subimages 180 degrees while maintaining their relative position with respect to the captured fingerprint image from which the fingerprint subimages are extracted, and combining the rotated and normalized fingerprint subimages into a fingerprint image.

This object is attained in a second aspect of the invention by a method of a fingerprint sensing system comprising a microlens array and an optical fingerprint sensor arranged under a touch-display of a device, and a processing unit configured to reconstruct a fingerprint image from a plurality of fingerprint subimages captured by the sensor. The sensor is configured to capture an image of a fingerprint, while the processing unit is configured to extract, from the captured fingerprint image, a fingerprint subimage for each microlens in the array, normalize the fingerprint subimages with corresponding subimages of a uniformity calibration image with known uniformity properties, rotate the normalized fingerprint subimages 180 degrees while maintaining their relative position with respect to the captured fingerprint image from which the fingerprint subimages are extracted, and combine the rotated and normalized fingerprint subimages into a fingerprint image.

When using an optical microlens array fingerprint sensor, a subimage will be created under each microlens on the fingerprint sensor. Hence, with the microlens array, the captured fingerprint image will be represented by multiple subimages which subsequently will be extracted from the captured fingerprint image and combined into a single partial or complete fingerprint image.

Inevitably, an optical microlens array fingerprint sensor will suffer from artefacts such as a 180-degree rotation (flipped up-down and left-right) around each optical axis compared to the object touching the display, radial irradiance drop-off, non-uniform illuminance, demagnification, lens distortion, etc.

The invention proposes a method for improving quality of captured images by calibrating the optical microlens array fingerprint sensor.

In order to compensate for one or more of the above-mentioned artefacts, an image referred to as a uniformity calibration image is captured. The uniformity calibration image is an image of an object with known reflectivity (having at least a higher reflection than any finger reflectance) and preferably has high uniformity.

Further, an image commonly referred to as a sensor background image may optionally be captured, for instance during production of the fingerprint sensor and/or the device in which the sensor is arranged.

Upon a user placing her finger on the touch-screen display of her smart phone, the fingerprint sensor captures a (partial or complete) fingerprint of the user. Using a microlens array will result in a plurality of subimages appearing on the sensor (one for each microlens), and a fingerprint subimage is extracted for each microlens in the array for separate processing.

Thereafter, the fingerprint subimages are corrected with respect to artefacts represented by the sensor background image by subtracting subimages of the sensor background image from the corresponding fingerprint subimages. Advantageously, the fingerprint subimages have been corrected with respect to for instance undesired pixel leakage light.

Likewise, the uniformity calibration subimages are corrected with respect to the artefacts represented by the sensor background image by subtracting the subimages of the sensor background image from the corresponding uniformity calibration subimages, resulting in the corrected uniformity calibration subimages. Advantageously, the uniformity subimages have now also been corrected with respect to for instance undesired pixel leakage light.

Now, in order to correct the (background image-corrected) fingerprint subimages with respect to uniformity, the fingerprint subimages that previously was corrected are normalized with the (background image-corrected) uniformity calibration subimages, which results in normalized and background image-corrected fingerprint subimages.

This is performed on a pixel-by-pixel-basis by dividing a value of each pixel in the background image-corrected fingerprint subimages with a value of a corresponding pixel in the uniformity calibration subimages, implying that the pixels will attain a value from 0 to 1.

Thereafter, due to the nature of the microlens array, which optically rotates the subimages 180°, the normalized and corrected fingerprint subimages are rotated 180° while maintaining their relative position with respect to the captured fingerprint image from which the fingerprint subimages are extracted.

Finally, the rotated, normalized and corrected fingerprint subimages are combined into a partial or complete fingerprint image, which hence advantageously has been corrected with respect to artefacts represented by the sensor background image as well as with respect to artefacts represented by the uniformity calibration image.

It is noted that one or more steps of the above described method may be performed in a different order while still maintaining the same final result.

In an embodiment, a 2D interpolation operation is performed on the rotated, normalized and corrected fingerprint subimages.

In an embodiment, central sections of the rotated, normalized and corrected fingerprint subimages are extracted for combination into a complete fingerprint image.

In an embodiment, the sensor background image is captured by capturing an image of a dark object contacting the display of the device in which the optical microlens array fingerprint sensor is arranged, or by capturing an image while the display is subjected to a dark environment.

In an embodiment, a uniformity calibration image is captured by capturing an image of an object contacting the display of the device, the object having higher reflectivity than a finger.

In an embodiment, a uniformity calibration image is captured by capturing an image of a finger being in close vicinity to the display of the device. Advantageously, this may be performed dynamically during enrolment/verification to attain a continuously updated uniformity calibration image.

In an embodiment, gain and/or exposure time of the optical microlens array fingerprint sensor are adapted upon capturing the fingerprint image to comply with the gain and/or exposure time applied upon capturing the uniformity calibration image and sensor background image.

In an embodiment, at least one image of an object of having a known pattern is captured, and the pattern of the captured image is compared with said known pattern for each subimage. Thereafter, a degree of demagnification that each subimage is subjected to is determined from said comparison, and each rotated, normalized and corrected fingerprint subimage is magnified in accordance with the degree of demagnification that each subimage is determined to be subjected to before the combination into a fingerprint image is performed. Any appropriate known pattern may be used, such as a dot pattern where the size of the dots are determined, a pattern in the form of a fingerprint, squares, circles, a periodically repeating pattern such as a periodic line pattern, etc.

It should be understood that one single image may be used, or a number of images. If a number of images are used, the images may be combined into a single image by averaging the images.

In an embodiment, the image of an object having a known pattern is captured by illuminating the display of the device to create the pattern on the display. The pattern being created by the illumination may be one of the patterns discussed in the above. It is possible to illuminate the display with an appropriate pattern, capture an image, illuminate the display with an inverted version of the pattern and capture a further image. Thereafter, the image used to determine the demagnification is the difference image of the two captured images. By using the difference between an image and its inverse, the contrast advantageously increases.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
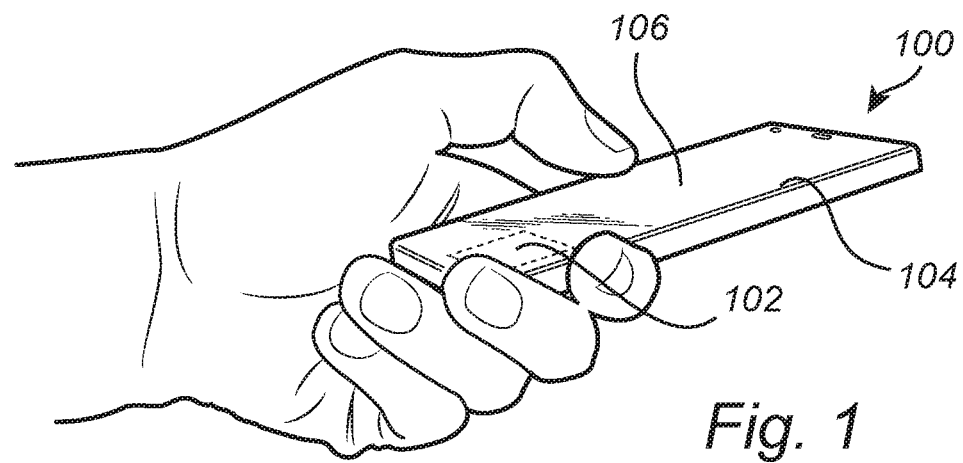
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
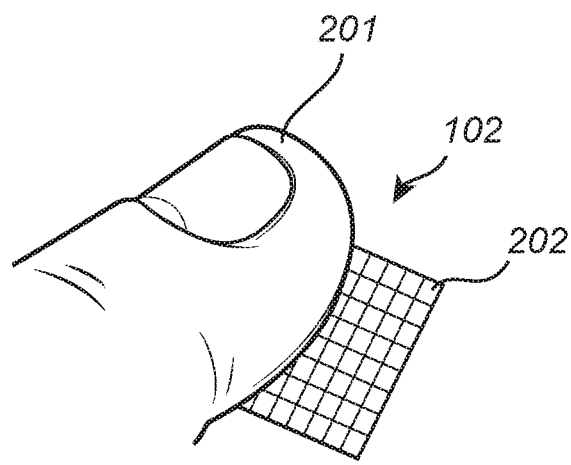
FIG. 2 shows a view of a fingerprint sensor onto which a user places the finger.

FIG. 2 illustrates a somewhat enlarged view of the fingerprint sensor 102 onto which a user places her finger 201. The fingerprint sensor 102 is configured to comprise a plurality of sensing elements. A single sensing element (also denoted as a pixel) is in FIG. 2 indicated by reference numeral 202.

Figure 3:
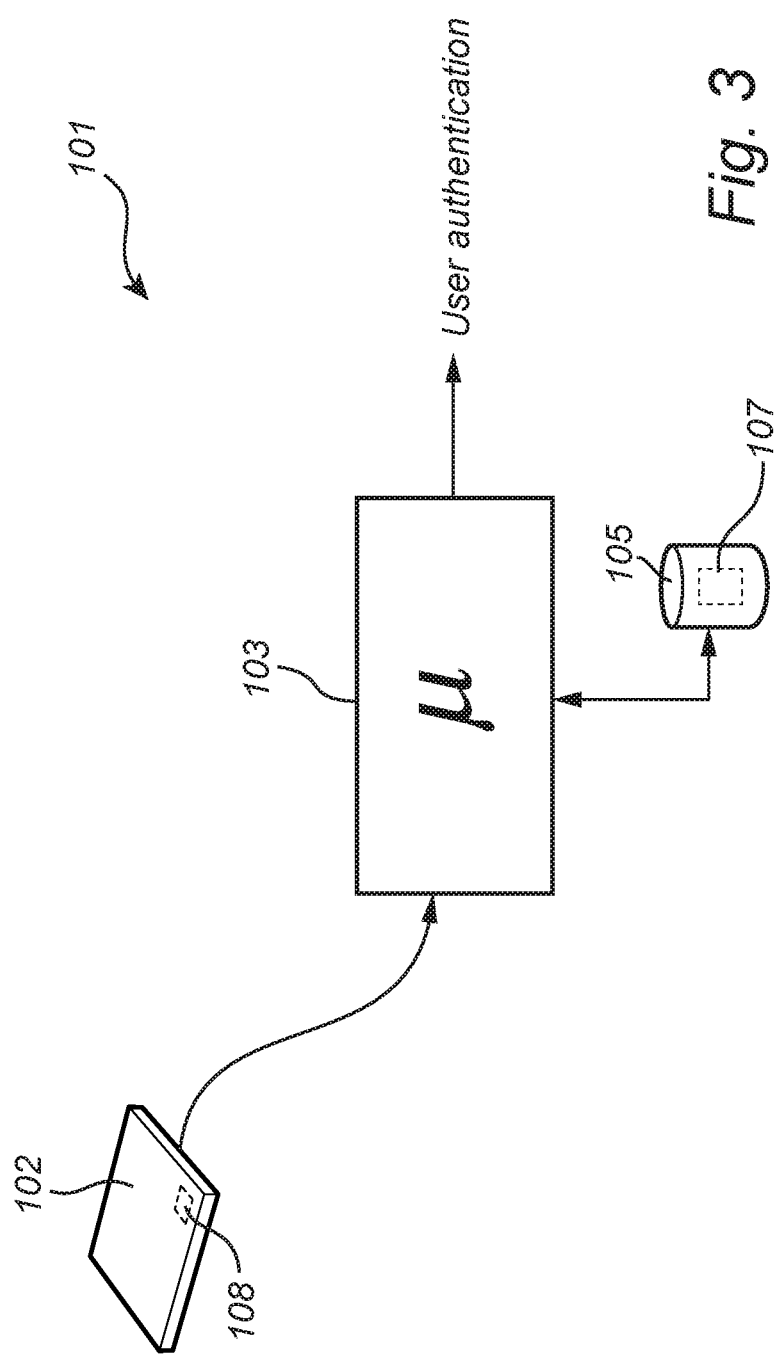
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random access memory (RAM) may be embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future optical fingerprint sensing principle In a general authorization process, the user places her finger 201 on the display surface 104 arranged above the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
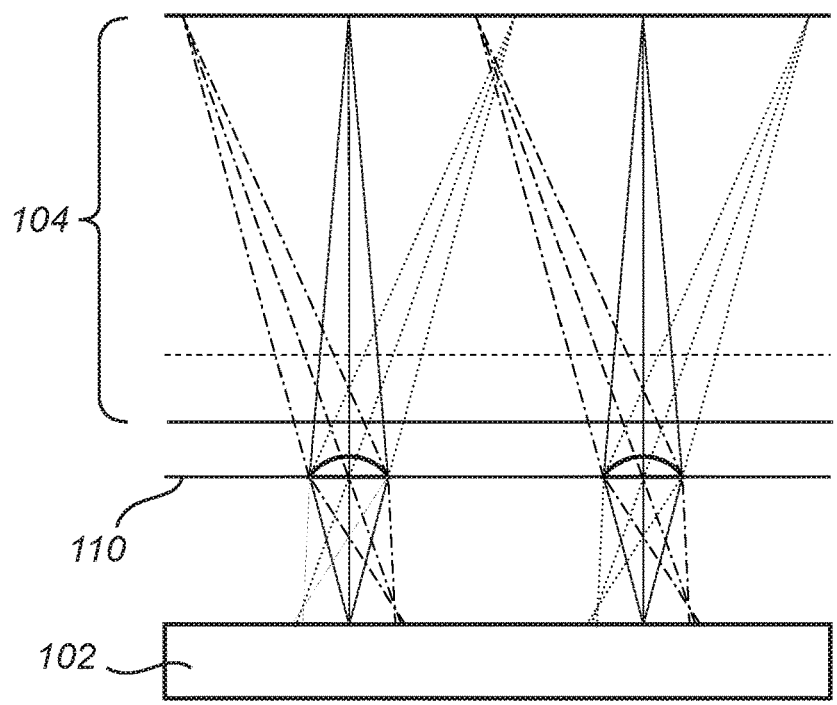
FIG. 4 schematically illustrates a sensor being equipped with a microlens array under a display of a device.

FIG. 4 illustrates a fingerprint sensor 102 arranged under a display 104 of e.g. a smart phone. The display 104 may for instance be a organic light-emitting diode (OLED) display with a thin-film transistor (TFT) backplane. As is understood, a user will place her finger on a top side of the display 104 and the fingerprint sensor 102 will via the microlens array 110 arranged above the sensor 102 under the display 104 capture an image of the fingerprint on a top side of the display 104.

Figure 5A:
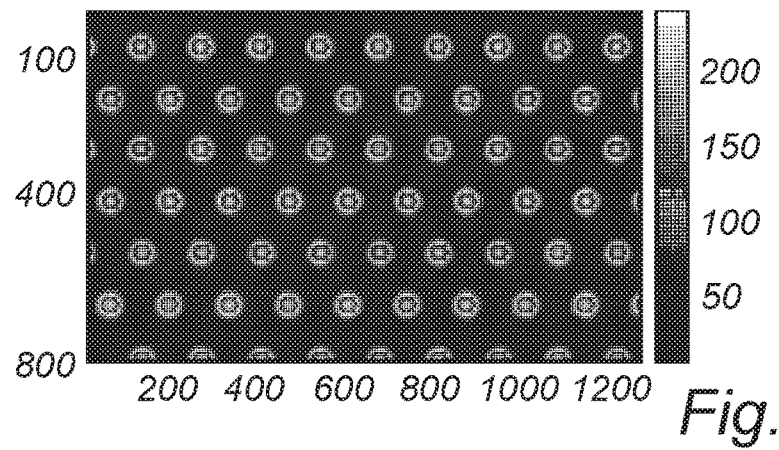
FIG. 5A illustrates subimages created under each microlens of the microlens array.

As illustrated in FIG. 5A, by using the microlens array 110, a subimage will be created under each microlens on the fingerprint sensor 102. Hence, with the microlens array 110, the captured fingerprint image will be represented by multiple subimages which subsequently will be extracted from the captured fingerprint image and combined into a single partial or complete fingerprint image.

Figure 5B:
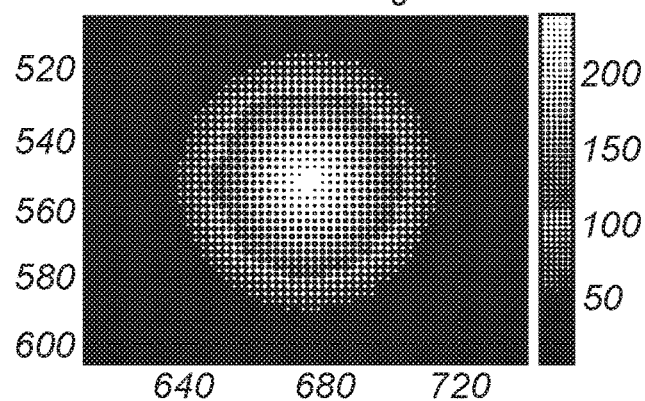
FIG. 5B illustrates a single enlarged subimage.

As can be seen in FIG. 5B illustrating a single (enlarged) subimage, the subimages will suffer from artefacts such as:
- a 180-degree rotation (flipped up-down and left-right) around each optical axis compared to the object touching the display 104;
- radial irradiance drop-off due to so called vignetting and field curvature for off-axis positions;
- non-uniform illuminance due to the spatially varying transmission through the OLED TFT backplane;
- demagnification relative to the object;
- lens distortion;
- partly overlapping field points with one or several other subimages; and
- reduced contrast due to light leakage from the display directly on the sensor.

A method for improving quality of captured images by calibrating the optical microlens array fingerprint sensor 102 will be described.

In order to compensate for one or more of the above-mentioned artefacts, an image commonly referred to as a sensor background image is captured, for instance during production of the fingerprint sensor 102 and/or the device 100 in which the sensor is arranged.

For a "perfect" sensor 102, display 104 and material between the two, a background image captured by the sensor 102 without an object being placed on the top side of the display 104 in a dark environment, or with a black or dark object commonly referred to as a rubber stamp placed on the display 104 according to an embodiment, would be uniformly black/grey, without any impairment data in the form of artefacts or noise present in the image, whereas in practice, artefacts forming some type of pattern will be present in the captured image.

Further, different individuals of fingerprint sensors are subjected to different impairments, as different displays and mountings of the sensor to the display, which as a result will give different appearances of the captured sensor background image.

As previously discussed, a captured sensor background image contains artefacts, for instance caused by leakage light from OLED pixels. These artefacts can be compensated for by subtracting the sensor background image from a captured fingerprint image.

Further, an image referred to as a uniformity calibration image is captured according to an embodiment. The uniformity calibration image is an image of an object with known reflectivity. For instance, a white ceramic plate is placed on the top side of the display 104, and an image is captured by the fingerprint sensor 102. The plate is highly reflective (or should at least have higher reflection than any finger reflectance) and preferably has high uniformity.

The uniformity calibration image representing a uniform and highly reflective object (such as the previously mentioned which ceramic plate) serve to compensate for both the radial irradiance drop-off and the non-uniformity from the spatially varying TFT transmission, and sensor pixel-to-pixel sensitivity variations. Furthermore, the uniformity calibration image can also be used to compensate for pixel defects, like stack or dead pixel or other fix pattern noise.

The uniformity calibration image(s) and sensor background image(s) may be recorded at several exposure times and/or gain values, preferably covering the possible range of exposure times and gain values. Each image can also be recorded by averaging more than one image to increase signal-to-noise ratio (SNR). In practice, the uniformity calibration image(s) and sensor background image(s) show similar types of artefacts, but to different extent.

Advantageously, in an embodiment the gain and/or exposure time of the optical microlens array fingerprint sensor 102 upon capturing the fingerprint image is adapted to comply with the gain and/or exposure time applied upon capturing the uniformity calibration image and sensor background image.

Furthermore, due to partially illuminated areas on the sensor 102, only the subimage areas may be extracted (in a square or any other appropriate shape) and exclude the non-illuminated areas outside the subimages. This will help to reduce the image size before the fingerprint data is forwarded to a processing unit 103 of the phone 100 for fingerprint verification.

The sensor background images and the uniformity calibration images are typically captured during manufacturing of the device 100 in which the sensor 102 is mounted. However, it could be envisaged that a pre-calibration is done before final assembly of the sensor 102 in the device 100 to acquire default calibration values and that these values are offset in the final calibration when the sensor 102 is mounted under the display 104 of the device 100.

Figure 6A:
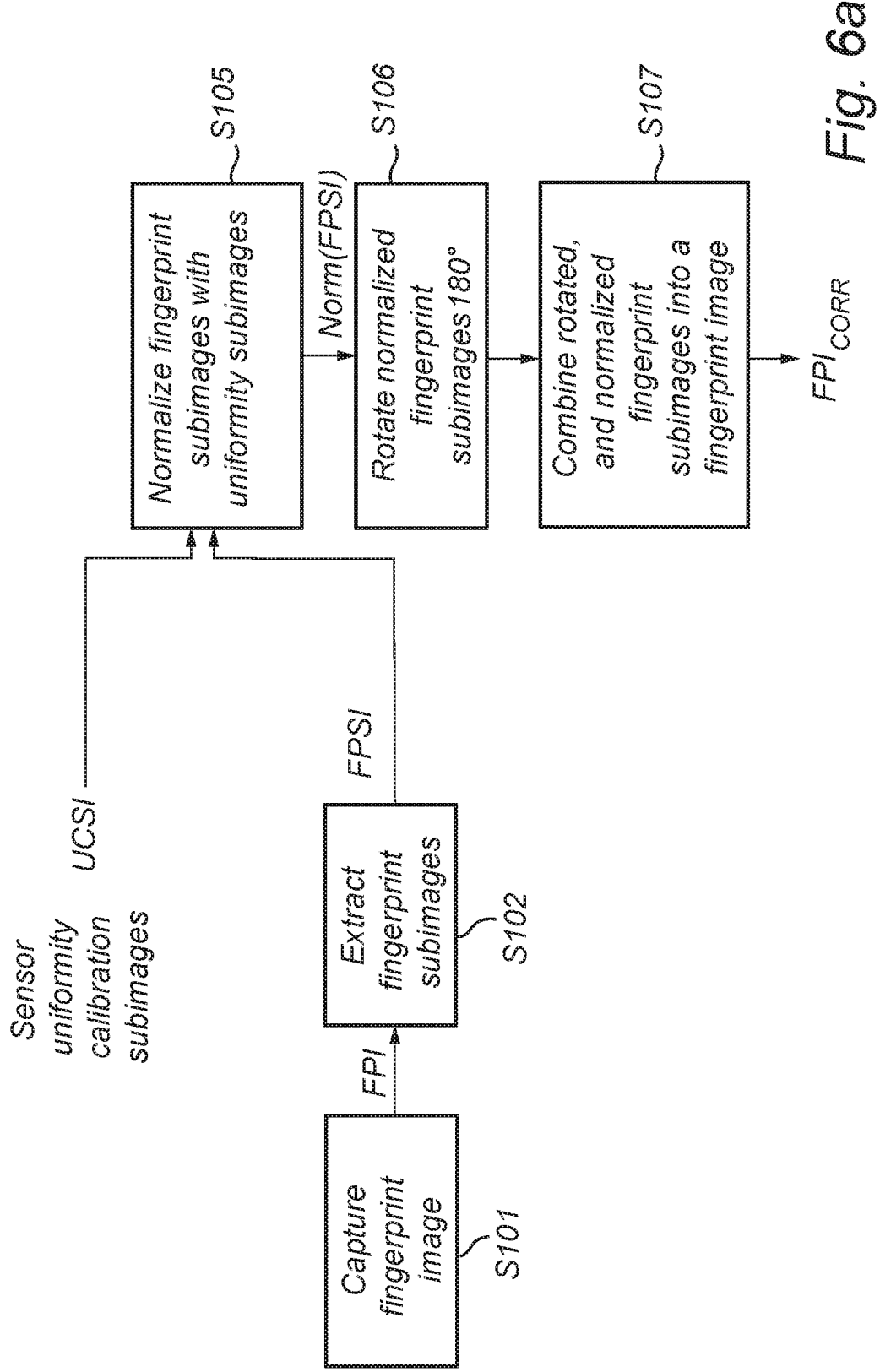
FIG. 6a illustrates a flowchart of a method of reconstructing a fingerprint image from a plurality of fingerprint subimages captured by an optical microlens array fingerprint sensor according to an embodiment.

FIG. 6a shows a flowchart illustrating a method of a reconstructing a partial or complete fingerprint image from a plurality of fingerprint subimages captured by an optical microlens array fingerprint sensor according to an embodiment.

In this particular embodiment, no background image is utilized to correct the fingerprint subimages, but a uniformity calibration image correction is applied.

In a first step S101, upon a user placing her finger on the touch-screen display 104 of her smart phone, the fingerprint sensor 102 captures a (partial or complete) fingerprint of the user. The captured fingerprint image is in FIG. 6a denoted FPI.

As previously described, using a microlens array 110 will result in a plurality of subimages appearing on the sensor 102 (one of each microlens), and a fingerprint subimage is extracted in step S102 for each microlens in the array for separate processing. These fingerprint subimages are referred to as FPSI.

Now, in order to correct the fingerprint subimages FPSI with respect to uniformity, the fingerprint subimages are normalized in step S105 with the uniformity calibration subimages UCSI, which results in normalized (and thus uniformity-corrected) fingerprint subimages FPSI being denoted Norm(FPSI).

This is performed on a pixel-by-pixel-basis by dividing a value of each pixel in the fingerprint subimages FPSI with a value of a corresponding pixel in the uniformity calibration subimages UCSI, implying that the pixels of Norm(FPSI) will attain a value from 0 to 1.

Thereafter, due to the nature of the microlens array 110, which optically rotates the subimages 180°, the normalized fingerprint subimages Norm(FPSI) are rotated 180° in step S106 while maintaining their relative position with respect to the captured fingerprint image FPI from which the fingerprint subimages FPSI are extracted.

Finally, in step S107, the rotated and normalized fingerprint subimages are combined into a partial or complete fingerprint image $FPI_{ORR}$, which hence advantageously has been corrected with respect to artefacts represented by the uniformity calibration image. Practically, the combining is undertaken in that the rotated and normalized fingerprint subimages are placed on the same grid as the final image while considering the relative position of each microlens. Thus, the individual rotated and normalized fingerprint subimages are assembled into a final image.

Biometric evaluation (enrolment and verification) is significantly easier on a uniformity-corrected image of the fingerprint as compared to the image illustrated with reference to FIG. 5A. Hence, by providing an artefact-corrected fingerprint image $FPI_{CORR}$, the biometric evaluation is greatly improved.

Figure 6B:
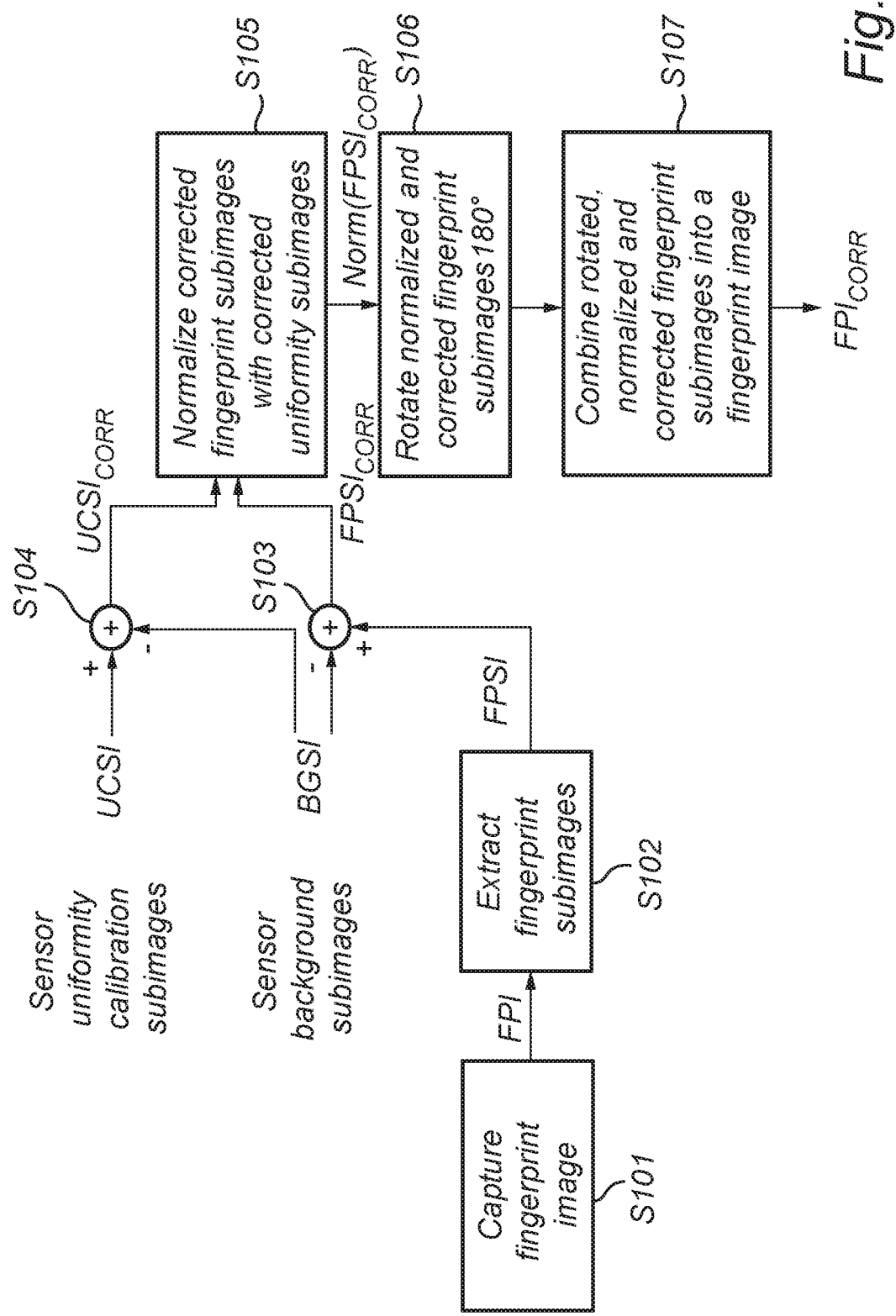
FIG. 6b illustrates a flowchart of a method of reconstructing a fingerprint image from a plurality of fingerprint subimages captured by an optical microlens array fingerprint sensor according to anther embodiment.

FIG. 6b shows a flowchart illustrating a method of a reconstructing a partial or complete fingerprint image from a plurality of fingerprint subimages captured by an optical microlens array fingerprint sensor according to an embodiment.

In this particular embodiment, a background image is further utilized to correct the fingerprint subimages, in addition to uniformity calibration image correction being applied.

In a first step S101, upon a user placing her finger on the touch-screen display 104 of her smart phone, the fingerprint sensor 102 captures a (partial or complete) fingerprint of the user. The captured fingerprint image is in FIG. 6b denoted FPI.

As previously described, using a microlens array 110 will result in a plurality of subimages appearing on the sensor 102 (one of each microlens), and a fingerprint subimage is extracted in step S102 for each microlens in the array for separate processing. These fingerprint subimages are referred to as FPSI.

Thereafter, in step S103, the fingerprint subimages FPSI are corrected with respect to artefacts represented by the previously discussed sensor background image by subtracting subimages (BGSI) of the sensor background image from the corresponding fingerprint subimages FPSI. Advantageously, the fingerprint subimages have been corrected with respect to for instance undesired leakage light from OLED pixels, which corrected fingerprint subimages are denoted $FPSI_{CORR}$.

Hence, from each extracted fingerprint subimage FPSI, a background subimage BGSI extracted at a corresponding spatial sensor position is subtracted.

Likewise, in step S104, the uniformity calibration subimages (UCSI) are corrected with respect to the artefacts represented by the sensor background image by subtracting the subimages BGSI of the sensor background image from the corresponding uniformity calibration subimages UCSI, resulting in the corrected uniformity calibration subimages $UCSI_{CORR}$. Advantageously, the uniformity subimages UCSI have been corrected with respect to for instance undesired leakage light from OLED pixels.

Now, in order to correct the (background image-corrected) fingerprint subimages $FPSI_{CORR}$ with respect to uniformity, the fingerprint subimages that was corrected in step S103 is normalized in step S105 with the (background image-corrected) uniformity calibration subimages $UCSI_{CORR}$, which results in normalized and background image-corrected fingerprint subimages $FPSI_{CORR}$ being denoted $Norm(FPSI_{CORR})$.

This is performed on a pixel-by-pixel-basis by dividing a value of each pixel in the background image-corrected fingerprint subimages $FPSI_{CORR}$ with a value of a corresponding pixel in the uniformity calibration subimages $UCSI_{CORR}$, implying that the pixels of $Norm(FPSI_{CORR})$ will attain a value from 0 to 1.

Thereafter, due to the nature of the microlens array 110, which optically rotates the subimages 180°, the normalized and corrected fingerprint subimages $Norm(FPSI_{CORR})$ are rotated 180° in step S106 while maintaining their relative position with respect to the captured fingerprint image FPI from which the fingerprint subimages FPSI are extracted.

Finally, in step S107, the rotated, normalized and corrected fingerprint subimages are combined into a partial or complete fingerprint image $FPI_{CORR}$, which hence advantageously has been corrected with respect to artefacts represented by the sensor background image as well as with respect to artefacts represented by the uniformity calibration image. Practically, the combining is undertaken in that the rotated, normalized and corrected fingerprint subimages are placed on the same grid as the final image while considering the relative position of each microlens. Thus, the individual rotated, normalized and corrected fingerprint subimages are assembled into a final image.

Biometric evaluation (enrolment and verification) is significantly easier on a corrected image of the fingerprint as compared to the image illustrated with reference to FIG. 5A. Hence, by providing an artefact-corrected fingerprint image $FPI_{CORR}$, the biometric evaluation is greatly improved.

In the following embodiments to be described, background image-correction as described with reference to FIG. 6b is performed. However, it should be noted that the following embodiments are equally applicable to the approach described in FIG. 6a where only uniformity image-correction is applied.

Figure 7:
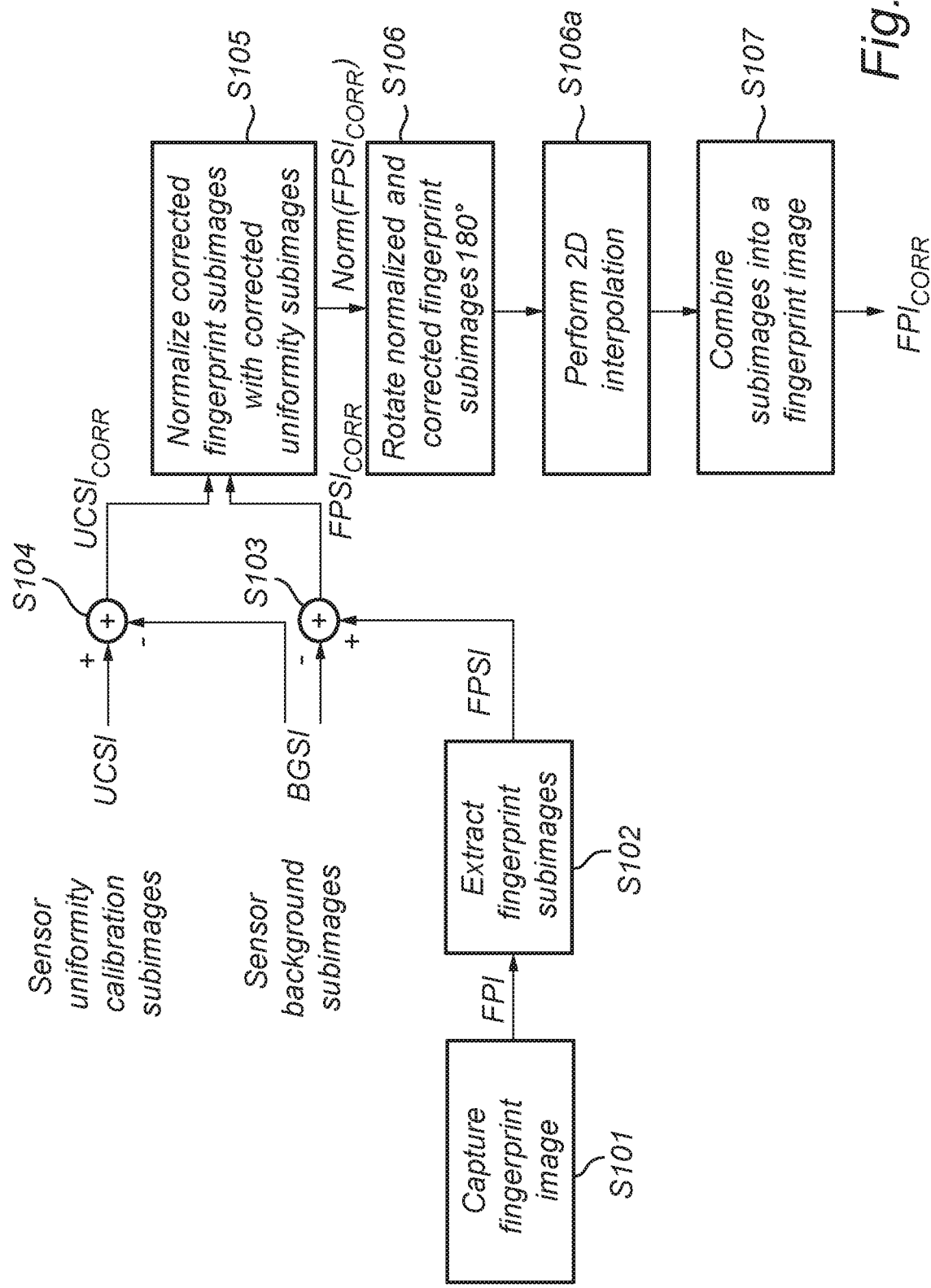
FIG. 7 illustrates a flowchart of a method of reconstructing a fingerprint image from a plurality of fingerprint subimages captured by an optical microlens array fingerprint sensor according to a further embodiment.

FIG. 7 shows a flowchart illustrating a method of a reconstructing a fingerprint image from a plurality of fingerprint subimages captured by an optical microlens array fingerprint sensor according to a further embodiment. In FIG. 7, steps S101-S106 are identical to those of FIG. 6b.

However, after the normalized and corrected fingerprint subimages $Norm(FPSI_{CORR})$ are rotated 180° in step S106, a 2D interpolation operation is performed on the rotated, normalized and corrected fingerprint subimages. This advantageously has the effect that any artefacts caused by distortion are corrected.

Thereafter, in step S107, the 2D-interpolated, rotated, normalized and corrected fingerprint subimages are combined into a partial or complete fingerprint image $FPI_{CORR}$, which advantageously is corrected with respect to artefacts represented by the sensor background image as well as with respect to artefacts represented by the uniformity calibration image and distortion.

Figure 8:
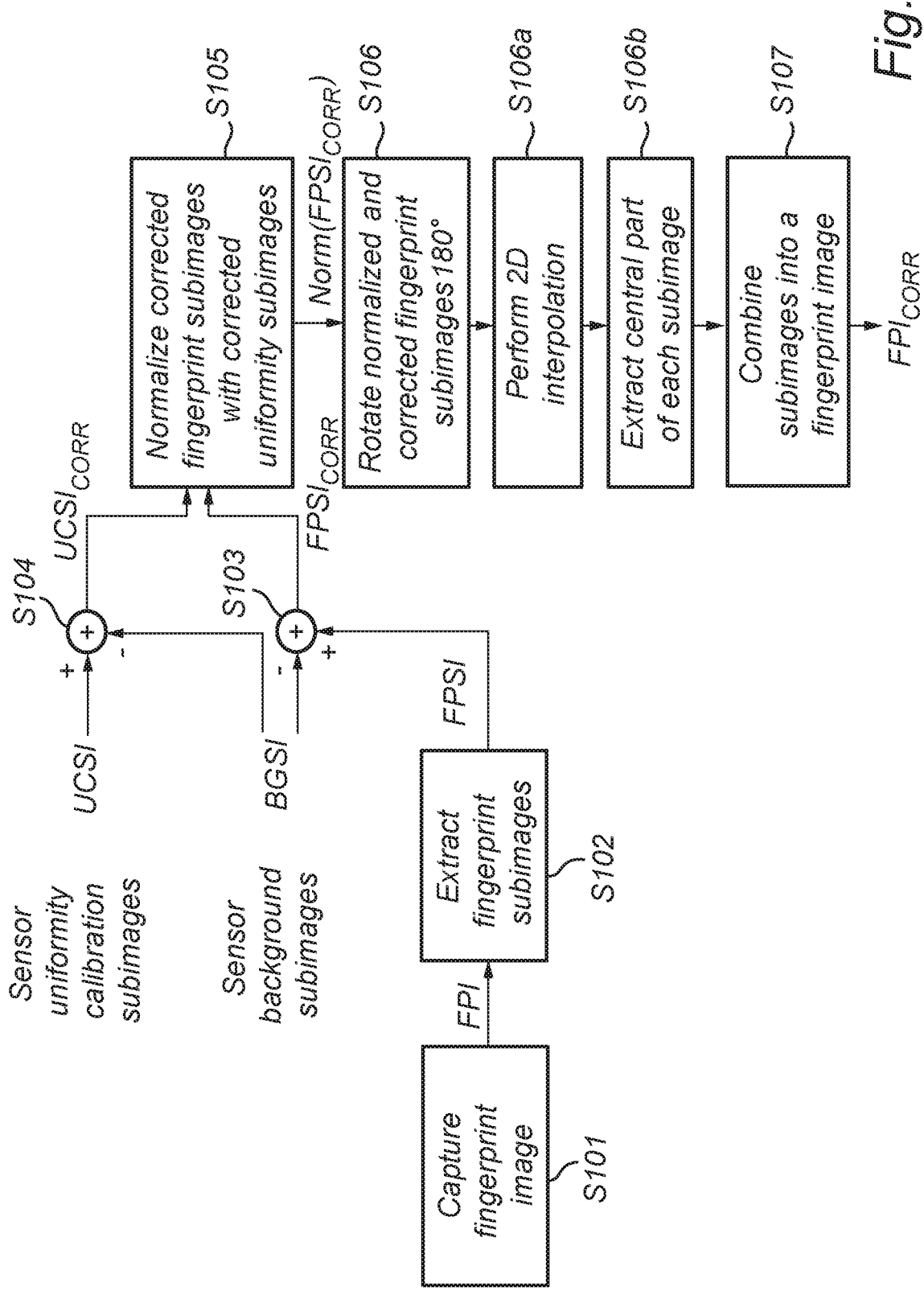
FIG. 8 illustrates a flowchart of a method of reconstructing a fingerprint image from a plurality of fingerprint subimages captured by an optical microlens array fingerprint sensor according to another embodiment.

FIG. 8 shows a flowchart illustrating a method of a reconstructing a fingerprint image from a plurality of fingerprint subimages captured by an optical microlens array fingerprint sensor according to yet a further embodiment. In FIG. 8, steps S101-S106a are identical to those of FIG. 9.

However, after the 2D interpolation of step S106a has been performed, or in case the method of FIG. 6b is applied; after the rotation of step S106 is performed, a confined section—i.e. the central section—of each subimage is advantageously extracted in step S106b, which typically has a higher quality than an outer section of the subimage (as can be concluded from FIG. 5B). For instance, the extracted confined section of each subimage may be circular, elliptical, square, or rectangular.

Thereafter, in step S107, the extracted central sections of the rotated, normalized and corrected fingerprint subimages are combined into a complete fingerprint image $FPI_{CORR}$, which advantageously is corrected with respect to artefacts represented by the sensor background image as well as with respect to artefacts represented by the uniformity calibration image. By using only the higher-quality central section of each subimage, the artefact-correction is advantageously further improved.

In an embodiment, the uniformity calibration subimages UCSI can alternatively be acquired by capturing an image or part of an image before the finger touches the display surface or when only a small portion of the finger has been registered being in the vicinity of the display surface. This can be done by evaluation of the touch screen signal or based on image processing of the images. In this case the finger acts as a uniform target. Since the finger is in close vicinity to the display surface, but does not contact the display, the finger will be out-of-focus when the image is captured resulting in a high uniformity, and the captured image will thus serve as a uniformity calibration image. Advantageously, with this embodiment, uniformity calibration images can be captured and updated at any time, and not only during the manufacturing/mounting phase resulting in a more dynamic calibration process.

It may also be envisaged that the uniformity calibration image is based on images captured after the finger has touched the display, in other words when the finger is moving away from the display. This image could be used as a calibration image for the next fingerprint enrolment/verification image. A number of fingerprint images may be captured and averaged into a single image. The uniformity calibration image can also be an average of a number of fingerprint images either acquired during a previous enrolment or verification process.

Further, an important parameter in the fingerprint image reconstruction process is the degree at which each fingerprint subimage FPSI is demagnified compared to the actual fingerprint object. This demagnification factor is sensitive to variations both inside the module itself (lens radius of curvature, distance between object and lens, index of refraction, etc.) and to variations in the mechanical assembly (actual distance between lens 110 and sensor 102 and tilt over the sensor surface).

Hence, the demagnification factor must be calibrated on a per-microlens-basis and can be calculated from an image referred to as a frequency calibration image, i.e. an image captured by the sensor 102 of an object having a particular regularly occurring pattern.

This can be done by recording an image with a fixed period pattern, e.g. lines and spaces of possibly 50% duty cycle. The image can be generated by placing a line target or any other target having a pattern with known frequency on the display or generating a frequency calibration image by lighting up a display pattern either with or without a reflective target contacting the display surface.

The frequency calibration image that is used for calculation of the module demagnification could also be recorded dynamically before, during or after finger touch (i.e. at enrolment and/or verification). In this case a frequency pattern can be generated by the display and the finger acts only as a reflection target/shield for external lighting. Since the display pattern is well defined the image of this pattern can be used to calculate the de-magnification. The display frequency pattern could be an integral part of a fingerprint icon or image that is used as part of the fingerprint application, either spatially or temporally.

Hence, in an embodiment, an image is captured of an object having a known pattern, or with the display being illuminated with a known lighting pattern (in which case no object is required). Thereafter, the period of the pattern of the captured image is compared with the known pattern. From this comparison, the degree of demagnification can be determined for each microlens. Each subimage is subsequently magnified individually based on the determined demagnification factor.

For instance, if it is determined that the captured image is demagnified with a factor 0.8, this can be compensated for by magnifying each subimage to be combined into a fingerprint image with a factor 1.25.

Figure 9:
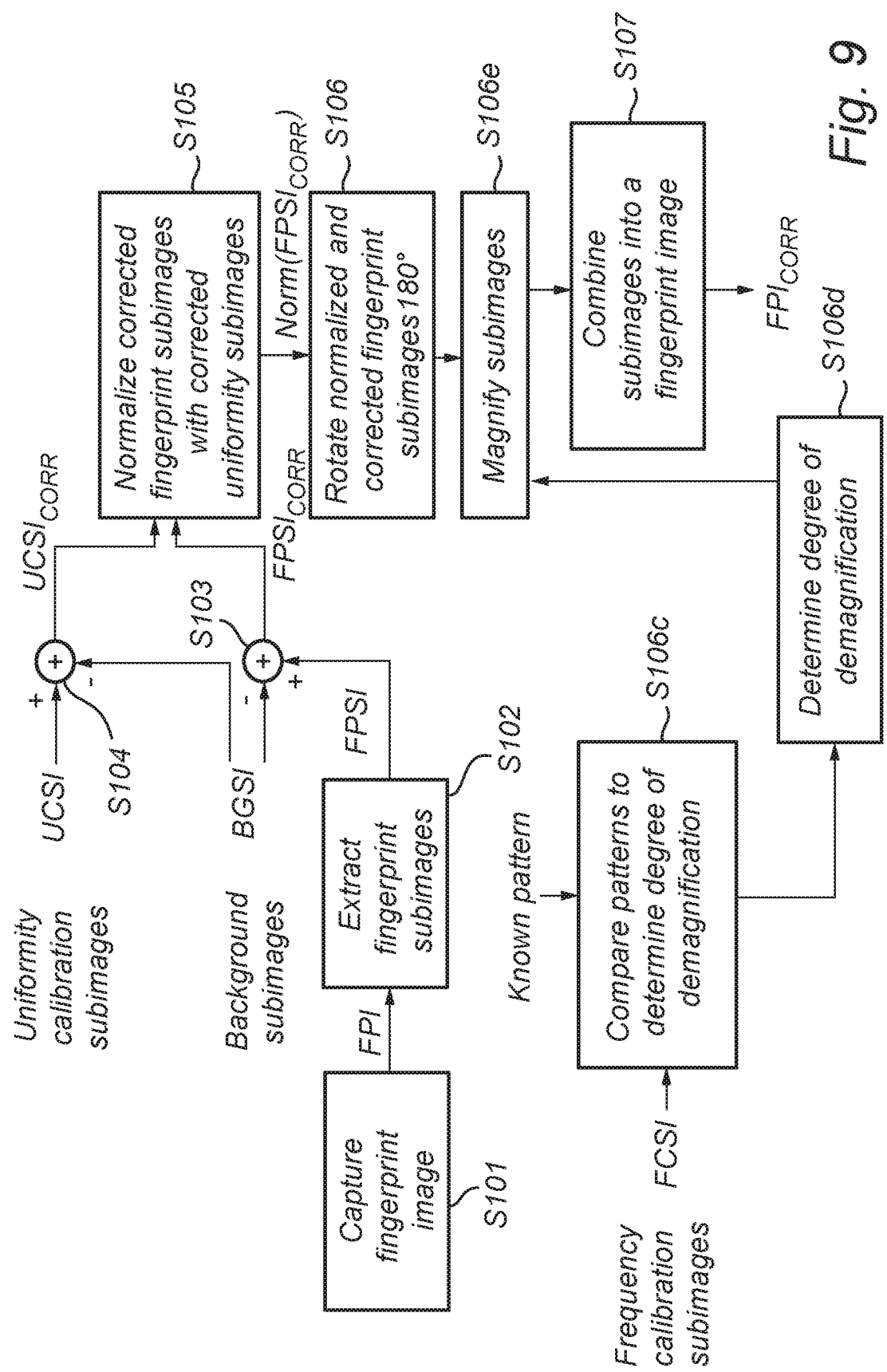
FIG. 9 illustrates a flowchart of a method of reconstructing a fingerprint image from a plurality of fingerprint subimages captured by an optical microlens array fingerprint sensor according to an embodiment.

FIG. 9 shows a flowchart illustrating a method of reconstructing a fingerprint image from a plurality of fingerprint subimages captured by an optical microlens array fingerprint sensor according to yet a further embodiment. In FIG. 9, steps S101-S106 are identical to those of FIG. 6b. For brevity, steps 106a and 106b are not included, but could also be performed in the embodiment shown in FIG. 9.

As can be seen, after the normalized and corrected fingerprint subimages Norm(FPSI$_{CORR}$) are rotated 180° in step S106, the previously discussed frequency calibration subimages (denoted FCSI) of an object of having a known pattern are utilized in that the pattern of the FCSIs are compared to said known pattern in step S106c.

From this comparison, the degree of demagnification that each individual subimage is subjected to—this may vary from subimage to subimage—is determined in step S106d. As previously mentioned, it is in an example assumed that the demagnification is 0.8 for a given subimage.

In order to compensate for this demagnification, a corresponding magnification is applied to the rotated, normalized and corrected fingerprint subimages in order to correct the subimages.

Thus, each subimage is magnified in step S106e in accordance with the degree of demagnification that each subimage is determined to be subjected to in step S106d. Hence, in this particular example, a magnification factor of 1.25 is applied, and the given subimage is corrected as regards the demagnification that it is subjected to.

Thereafter, in step S107, the rotated, normalized, corrected and magnified fingerprint subimages are combined into a fingerprint image FPI$_{CORR}$, which advantageously is corrected with respect to artefacts represented by the sensor background image as well as with respect to artefacts represented by the uniformity calibration image and the frequency calibration image (i.e. demagnification).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of reconstructing a fingerprint image from a plurality of fingerprint subimages captured by an optical microlens array fingerprint sensor arranged under a touch-display of a device, comprising:
    capturing an image of a fingerprint with the fingerprint sensor;
    extracting, from the captured fingerprint image, a fingerprint subimage for each microlens in the array;
    normalizing the fingerprint subimages with corresponding subimages of a uniformity calibration image with known uniformity properties;
    rotating the normalized fingerprint subimages 180 degrees while maintaining their relative position with respect to the captured fingerprint image from which the fingerprint subimages are extracted; and
    combining the rotated and normalized fingerprint subimages into a fingerprint image.

2. The method of claim 1, further comprising:
    creating corrected fingerprint subimages by subtracting subimages of a sensor background image from the corresponding extracted fingerprint subimages;
    creating corrected uniformity calibration subimages by subtracting subimages of the sensor background image from corresponding subimages of a uniformity calibration image with known uniformity properties; wherein the normalizing comprises:
    normalizing the corrected fingerprint subimages with the corrected uniformity calibration subimages; the rotating comprises:
    rotating the normalized and corrected fingerprint subimages 180 degrees while maintaining their relative position with respect to the captured fingerprint image from which the fingerprint subimages are extracted; and the combining comprises:
    combining the rotated, normalized and corrected fingerprint subimages into a fingerprint image.

3. The method of claim 1, further comprising:
    performing a 2D interpolation operation on the rotated, normalized and corrected fingerprint subimages.

4. The method of claim 1, further comprising:
    extracting sections of the rotated, normalized and corrected fingerprint subimages for combination into a complete fingerprint image.

5. The method of claim 1, wherein a sensor background image is captured by capturing at least one image of a dark object contacting the display of the device in which the optical microlens array fingerprint sensor is arranged, or by capturing at least one image while the display is subjected to a dark environment.

6. The method of claim 1, wherein at least one uniformity calibration image is captured by capturing an image of an object contacting the display of the device, the object having higher reflectivity than a finger.

7. The method of claim 1, wherein at least one uniformity calibration image is captured by capturing at least one image of a finger being in close vicinity to the display of the device.

8. The method of claim 1, further comprising:
adapting a gain and/or exposure time of the optical microlens array fingerprint sensor upon capturing the fingerprint image to comply with the gain and/or exposure time applied upon capturing the uniformity calibration image and sensor background image.

9. The method of claim 1, further comprising:
capturing at least one image of an object of having a known pattern;
comparing the pattern of the captured at least one image with said known pattern for each subimage;
determining, from said comparison, a degree of demagnification that each subimage is subjected to; and
magnifying each rotated, normalized and corrected fingerprint subimage in accordance with the degree of demagnification that each subimage is determined to be subjected to before performing the combination into a fingerprint image.

10. The method of claim 9, wherein the at least one image of an object having a known periodically repeating pattern is captured by capturing an image of the object having the known pattern.

11. The method of claim 8, wherein the at least one image of an object having a known pattern is captured by illuminating the display of the device to create the periodically repeating pattern on the display.

12. A fingerprint sensing system comprising a microlens array and an optical fingerprint sensor arranged under a touch-display of a device, and at least one processor configured to reconstruct a fingerprint image from a plurality of fingerprint subimages captured by the sensor, the sensor being configured to:
capture an image of a fingerprint; and the at least one processor being configured to
extract, from the captured fingerprint image, a fingerprint subimage for each microlens in the array;
normalize the fingerprint subimages with corresponding uniformity calibration subimages of a uniformity calibration image with known uniformity properties;
rotate the normalized fingerprint subimages 180 degrees while maintaining their relative position with respect to the captured fingerprint image from which the fingerprint subimages are extracted; and
combine the rotated and normalized fingerprint subimages into a fingerprint image.

13. The system of claim 12, the at least one processor further being configured to:
create corrected fingerprint subimages by subtracting subimages of a sensor background image from the corresponding extracted fingerprint subimages;
create corrected uniformity calibration subimages by subtracting subimages of the sensor background image from corresponding subimages of a uniformity calibration image with known uniformity properties; further being configured to, when performing the normalizing:
normalize the corrected fingerprint subimages with the corrected uniformity calibration subimages; further being configured to, when performing the rotating:
rotate the normalized and corrected fingerprint subimages 180 degrees while maintaining their relative position with respect to the captured fingerprint image from which the fingerprint subimages are extracted; and further being configured to, when performing the combining:
combine the rotated, normalized and corrected fingerprint subimages into a fingerprint image.

14. The system of claim 12, the at least one processor further being configured to:
perform a 2D interpolation operation on the rotated, normalized and corrected fingerprint subimages.

15. The system of claim 12, the at least one processor further being configured to:
extract central sections of the rotated, normalized and corrected fingerprint subimages for combination into a complete fingerprint image.

16. The system of claim 12, the sensor being configured to capture a sensor background image by capturing at least one image of a dark object contacting the display of the device in which the microlens array and the fingerprint sensor are arranged, or by capturing at least one image while the display is subjected to a dark environment.

17. The system of claim 12, the sensor being configured to capture a uniformity calibration image by capturing at least one image of an object contacting the display of the device, the object having higher reflectivity than a finger.

18. The system of claim 12, the sensor being configured to capture a uniformity calibration image by capturing at least one image of a finger being in close vicinity to the display of the device.

19. The system of claim 12, the at least one processor further being configured to:
adapt a gain and/or exposure time of the optical fingerprint sensor upon capturing the fingerprint image to comply with the gain and/or exposure time applied upon capturing the uniformity calibration image and sensor background image.

20. A computer program product comprising a non-transitory computer readable medium, the computer readable medium having a computer program embodied thereon, the computer program comprising computer-executable instructions for causing a fingerprint sensing system to perform steps recited in claim 1 when the computer-executable instructions are executed on at least one processor a included in the fingerprint sensing system.

* * * * *